(12) United States Patent
Nation et al.

(10) Patent No.: US 7,831,653 B2
(45) Date of Patent: Nov. 9, 2010

(54) FLEXIBLE TEMPLATE HAVING EMBEDDED GATE ARRAY AND COMPOSABLE MEMORY FOR INTEGRATED CIRCUITS

(75) Inventors: George Wayne Nation, Eyota, MN (US); Gary Scott Delp, Rochester, MN (US); William D. Scharf, San Jose, CA (US); Narayanan Raman, Milpitas, CA (US); John N. Fryar, III, Apex, NC (US); Majid Bemanian, Pleasanton, CA (US)

(73) Assignee: LSI Corporation, Milpitas, CA (US)

( * ) Notice: Subject to any disclaimer, the term of this patent is extended or adjusted under 35 U.S.C. 154(b) by 2078 days.

(21) Appl. No.: 10/318,792

(22) Filed: Dec. 13, 2002

(65) Prior Publication Data
US 2004/0114622 A1 Jun. 17, 2004

(51) Int. Cl.
*G06F 15/16* (2006.01)
(52) U.S. Cl. .................... 709/200; 709/230
(58) Field of Classification Search .......... 716/1–2, 716/6, 16; 709/250
See application file for complete search history.

(56) References Cited

U.S. PATENT DOCUMENTS

| | | | |
|---|---|---|---|
| 4,656,592 A | 4/1987 | Spaanenburg et al. | |
| 5,818,728 A * | 10/1998 | Yoeli et al. | 716/16 |
| 5,818,729 A * | 10/1998 | Wang et al. | 716/9 |
| 5,903,475 A * | 5/1999 | Gupte et al. | 703/16 |
| 6,331,790 B1 * | 12/2001 | Or-Bach et al. | 326/41 |
| 6,345,378 B1 * | 2/2002 | Joly et al. | 716/2 |
| 6,459,136 B1 * | 10/2002 | Amarilio et al. | 257/529 |
| 6,707,314 B2 * | 3/2004 | Kasahara et al. | 326/38 |
| 7,100,133 B1 * | 8/2006 | Meiyappan et al. | 716/5 |
| 2003/0081391 A1 * | 5/2003 | Mowery et al. | 361/764 |
| 2004/0049613 A1 * | 3/2004 | Kim et al. | 710/52 |
| 2005/0041685 A1 * | 2/2005 | Logvinov et al. | 370/466 |
| 2006/0168367 A1 * | 7/2006 | Beckett et al. | 710/22 |
| 2008/0034130 A1 * | 2/2008 | Perego et al. | 710/23 |

FOREIGN PATENT DOCUMENTS

| | | |
|---|---|---|
| JP | 01202397 | 7/2001 |
| JP | 02202886 | 7/2002 |

* cited by examiner

*Primary Examiner*—Thu Nguyen
*Assistant Examiner*—Tauqir Hussain
(74) *Attorney, Agent, or Firm*—Suiter Swantz pc llo

(57) ABSTRACT

A partially manufactured semiconductor chip comprising a slice and a number of shells is a template for a communication and networking chip. The slice has a number of I/O ports, blocks, and PHYs. The hardmac PHYs are established to correspond to a high speed data transmission protocol. The interior of the template comprises logic gate arrays and configurable memory. Once particular protocols of data receipt and transmission are selected, the logic gate arrays and configurable memory can be programmed and otherwise configured to develop protocol layers for data networking and communication.

9 Claims, 9 Drawing Sheets

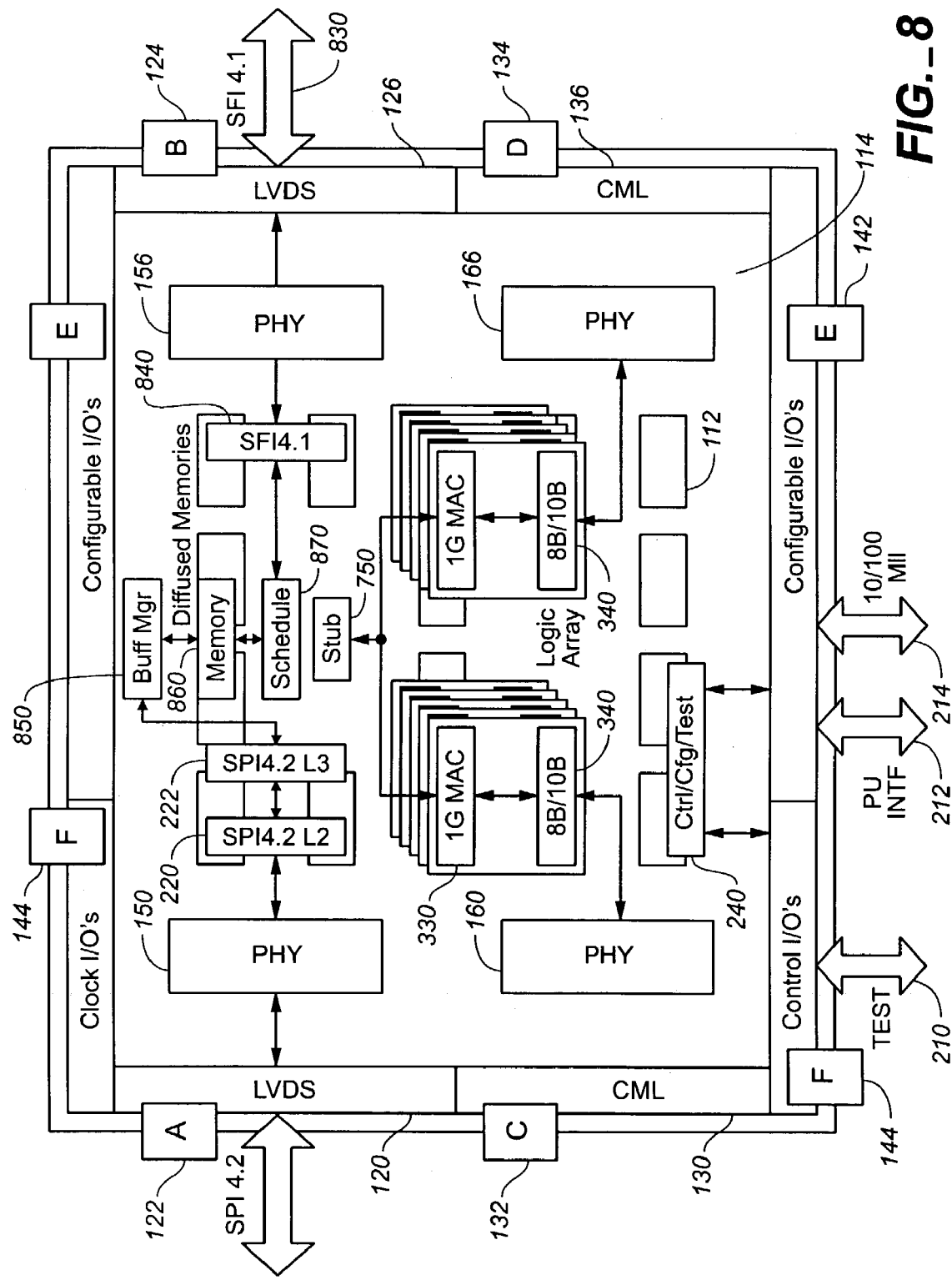
FIG._8

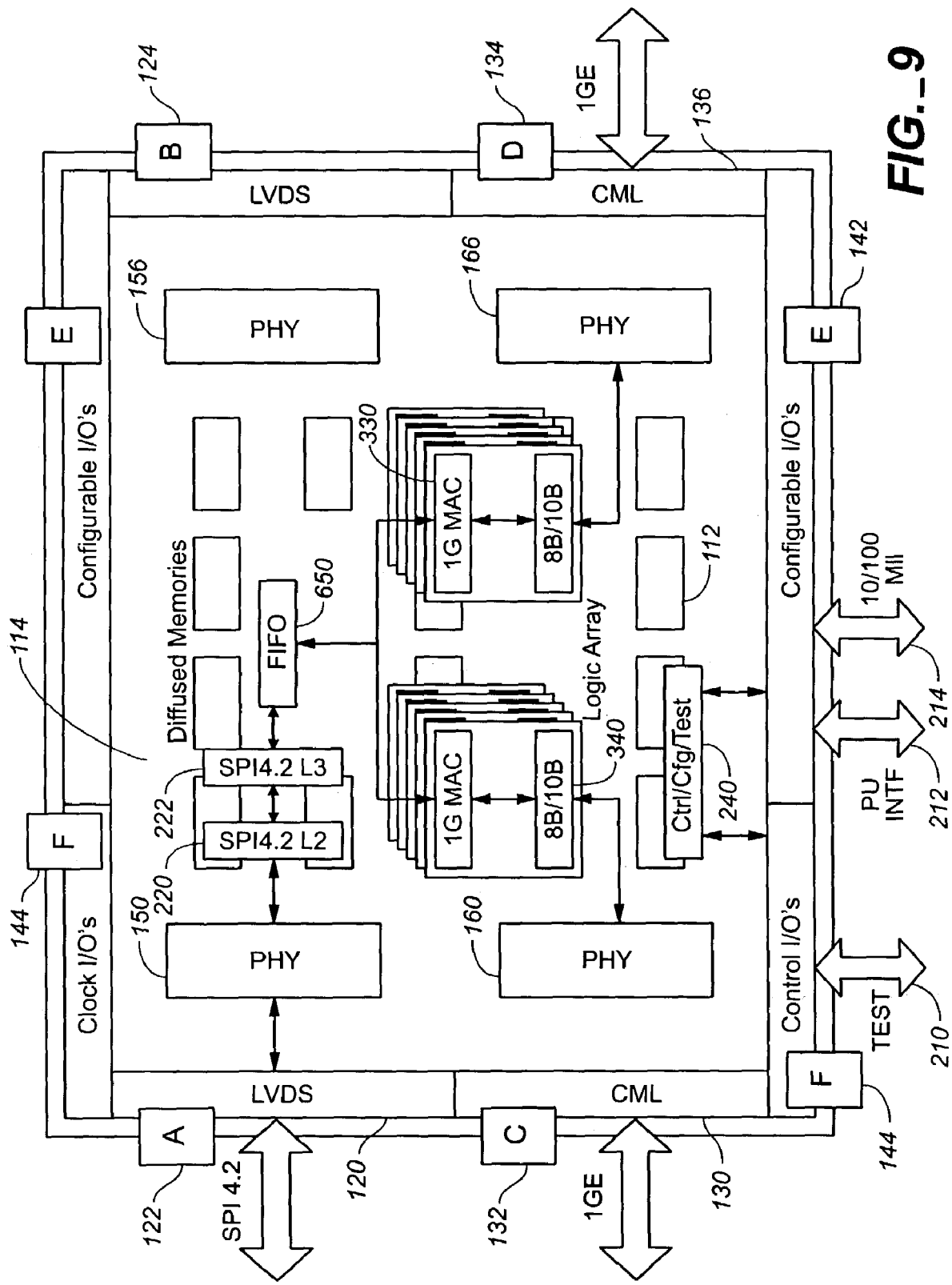
FIG._9

FLEXIBLE TEMPLATE HAVING EMBEDDED GATE ARRAY AND COMPOSABLE MEMORY FOR INTEGRATED CIRCUITS

CROSS REFERENCE TO RELATED APPLICATIONS

The present application is related to the following United States patent application, which is hereby incorporated by reference in its entirety: application Ser. No. 10/318,623, U.S. Pat. No. 7,069,523 issued with the title: Automated Selection and Placement of Memory During Design of an Integrated Circuit.

FIELD OF THE INVENTION

This invention relates to the field of electronic integrated circuit design, and more particularly to a template for input/output transceiver chips having composable memory and embedded gate arrays capable of embodying multiple and different communication protocols and transceivers.

BACKGROUND

Integrated circuits and chips have become increasingly complex, with the speed and capacity of chips doubling about every eighteen months. This increase has resulted from advances in design software, fabrication technology, semiconductor materials, and chip design. The increased density of transistors per square centimeter and faster clock speeds, however, make it increasingly difficult to specify and design a chip that performs as actually specified. Unanticipated and sometimes subtle interactions between the transistors and other electronic structures may adversely affect the performance of the circuit. These difficulties increase the expense and risk of designing and fabricating chips, especially those that are custom designed for a specific application. The demand for complex custom-designed chips increases with the burgeoning number and variety of microprocessor-driven applications and products yet the time and money required to design chips have become a bottleneck bringing these products to market. Without an assured successful outcome within a specified time, the risks have risen along with costs, and the result is that fewer organizations are willing to attempt the design and manufacture of custom chips.

Without a doubt, integrated circuits must communicate with one another. Most communication data between computers is digital data, meaning that the information content is contained in the series of "0"s and "1"s represented by different voltage levels of the signals. Where once stand-alone desktop computers were the norm, now networked computers are the standard of efficiency since the Internet has fueled the exponential growth of the communicating information, especially in the medical, entertainment, teleworking, and consumer fields. One model of communication between devices over an electronic network is the open system interconnection (OSI) model having seven layers between stations; these layers are referred to as protocol layers. Control is passed from one protocol layer to the next, starting at the application layer in one station, proceeding to the bottom or physical layer, over the channel to the next station and back up the hierarchy to the application layer.

The bottom layer is the physical layer, the PHY, that conveys the bit stream, i.e., the electrical impulses, light or radio signals at the electrical and mechanical level. The PHY is the hardware for sending and receiving data and includes the transceiver. In some models, the PHY may have three components: (1) one which encodes and decodes the data stream to and from the upper layers; (2) another which serializes coded groups into bit streams and then deserializes the receiving bit streams into code groups; and (3) the actual electronics for signal transmission including the amplification, modulation, wave shaping, and transmission. There is a whole spectrum of PHYs and respective transceivers dedicated to the exchange of electronic and optical data through networks and/or within computers or other microprocessor-driven devices. The physical parameters that determine what PHY is appropriate for what network and what data includes whether the data is optical or electrical, digital or analog, the frequency of the data, the attenuation and the bandwidth of the exchange medium, the impedance, the signal voltages, and other electrical characteristics of the electronics on either side of the transmission medium, etc. Bandwidth is simply how much digital data, whether it be voice, text, or video data, can be sent through a connection. As examples, cellular telephones are low bandwidth and the transmission medium is air whereas cable television is high bandwidth using fiber optics as a transmission medium. Broadband refers to the transmission rates needed to simultaneously receive voice, data, graphics and multimedia applications and are measured by how many bits of data can cross the wire each second. Slower transmission speeds are measured in kilobits per second (Kbps), while faster transmissions are in megabits per second (Mbps) or gigabits per second (Gbps). At these high transmission rates, the medium can be fiber optics and/or copper wire. An example of one kind of PHY embodies full duplex, point-to-point communications channel for gigabit speed serial interfaces that is independent of the protocol and may be independent of the media. These interfaces are compatible with storage subsystems, network switches and routers, storage area networks, and high-speed backplanes. Another type of PHY may be an optoelectronic interconnect for broadband and networking applications for extremely high bandwidth CMOS ASICs. Ethernet, Fibre Channel, SONET/SDH, Serial ATA, and ATM are examples of protocols requiring specialized PHY layers. The PHY is connected to the next protocol layer, the data link layer, in which data packets are encoded and decoded into bits. The data link layer has knowledge of the transmission protocol, manages errors in the PHY, flow control, and frame synchronization. The data link layer is divided into two sublayers: (a) the media access control (MAC) layer and the logical link control (LLC) layer. The MAC sublayer controls how to access the data and gains permission to transmit the data. The LLC layer controls frame synchronization, flow control and error checking. There are a variety of MACs that support copper and optical fiber networks at data transmission speeds ranging from 10 to 1000 Megabits per second (Mbps) on a single platform to many gigabits per second (Gbps).

The next protocol layer beyond the data layer is the network layer that provides switching and routing technologies, creating logical paths for transmitting data from node to node, or from server to server. Addressing, internetworking, error handling, congestion control and packet sequencing are also functions of the network layer. The transport layer is the protocol layer after the network layer and provides transparent transfer of data between end systems or hosts, and is responsible for end-to-end error recovery, flow control, and ensures complete data transfer. The fifth protocol layer, the session layer, establishes, manages and terminates the conversations, exchanges, and dialogues between the applications at each end, and deals with session and connection coordination. The next protocol layer, the presentation layer, provides independence from differences in data representation, e.g., encryption, by translating from application to network format, and vice versa. The presentation layer works to transform data into the form that the application layer can accept by, for example, formatting and encrypting data, to be sent across a network. The presentation layer provides freedom from compatibility problems and is sometimes called the syntax layer. The application layer is the last protocol layer and supports end-user processes. Communication partners are identified, quality of service is identified, user authentication and privacy are considered, and any constraints on data syntax are identified. The application layer provides services for file transfers, e-mail, and other network software services. Telnet and FTP are applications that exist entirely in the application level. The OSI model is only one model and is nothing more than a conceptual guideline. The actual layers are not easily categorized. There may be, for instance, an overlap or even differences between the functions of the different protocol layers than as described above.

The convergence of systems used in the local area network (LAN), wide area network (WAN), metro area network (MAN), and storage area network (SAN) environments requires new interoperable communications technologies to support multiple protocols, including, e.g., Ethernet for the LAN, SONET/SDH (synchronous optical network/synchronous digital hierarchy) for the MAN/WAN, and Fibre Channel for the SAN. Several digital data communication standards have facilitated the growth of the communications industry, and one such standard having the capability for broadband, gigabit, low voltage communications is the System Packet Interface Level 4, Phase 2 (SPI4-2) that defines the MAC and PHY layers for a network for devices in close proximity. Originally designed for packet and cell transfer between a MAC device and an ASIC, network processor unit (NPU), or switch fabric, SPI4-2 supports the transmission of multiple communications protocols up to 10 Gbps including Packet over SONET/SDH (POS), OC-192, 10/100/1000 Ethernet, 10 GbE, and 10G SAN By providing a common interface for 10 Gbps WAN, LAN, MAN and SAN technologies, SPI4-2 is ideal for systems that aggregate multiple low-data rate channels into a single 10 Gbps uplink for long-haul or backbone transmission.

Another standard is the 10 Gigabit Ethernet standard that extends Ethernet applications to operating speeds of 10 Gbps and still be compatible with older, slower Ethernet protocols. The 10 Gigabit Ethernet standard is full-duplex and uses fiber optics, thus extending the speed and capability of Ethernet. The XAUI (pronounced zow' ee) for 10 gigabit attachment unit interface, is an Ethernet-only specification (IEEE802.3ae), defined for MAC to PHY connections in 10G Ethernet systems, unlike SPI4-2 which is a suitable system-level interface for point-to-point connections between MACs and NPUs or switch fabric devices.

Typically high speed interfaces are differential, meaning that the data is encoded in a voltage between the normal digital high voltage of one volt as a "1" and the normal digital low voltage of 0 volts as a "0". A differential voltage enables faster data transfer rates because of smaller voltage transitions. There are several high speed serial interfaces, and, ranked in approximate order of speed from slowest to fastest, they are: emitter coupled logic (ECL), positive emitter-coupled logic (PECL), low voltage differential signaling (LVDS), and current mode logic (CML). ECL is the traditional high-speed logic technology, originally based on bipolar transistor differential pairs with a negative bias supply. PECL is a form of ECL referenced to a positive bias. ECL devices have propagation delays in the region of 200 picoseconds and toggle frequencies over 3GHz. Of all the interfaces available today, CML swings at about one-half volt and operates at the highest speed and is used in applications requiring gigabit data rates. LVDS is a low noise, low power, low amplitude method for data transmission over copper wire at the gigabits per second range. Low voltage means that, in accordance with an industry standard, the differential signals have an amplitude ranging from 250 millivolts to 400 millivolts at an offset of 1.2 volts. LVDS uses a dual wire system running 180 degrees of each other so that noise is filtered easily and effectively. ECL and PECL transmitter-output signal swings are higher and the propagation delays are shorter than those of LVDS transmitters, thus ECL and PECL devices dissipate power and thus heat more.

Because there are so many variations in the applications, the data, the speeds, and standards, it becomes expensive and burdensome to design and manufacture individual full custom chips for specific applications and protocols. Thus, there is a need in the industry to accommodate desired flexibility and variety available in high speed digital communications. In addition, developers need off-the-shelf building blocks to design these multisystem solutions to save time and engineering resources.

SUMMARY OF THE INVENTION

What will be disclosed herein is a template for a plurality of data transmission protocols, the template comprising: a plurality of input/output (I/O) blocks; a plurality of PHYs connected to each of the plurality of I/O blocks; at least one RTL shell, and a plurality of configurable gate arrays, a portion of which is configured by the at least one RTL shell into at least one protocol layer connected to at least one of the plurality of PHYs. The template may further comprise a plurality of configurable memory arrays, and portions of the memory arrays may also be configured into the protocol layers and hardware necessary for data receipt and transmission. At least one I/O block, its connected PHY and its configured protocol layer may be established to receive data in a first protocol. Another I/O block, its connected PHY and its configured protocol layer may receive data in a second protocol. The template then is an integrated circuit to transfer data between the two or more protocols. The protocols may be such industry standards as SPI4.2, Gigabit Ethernet, PCI, SFI4.1, Fibre Channel, Serial ATA, etc.

BRIEF DESCRIPTION OF THE DRAWINGS

The numerous advantages of the present invention may be better understood by reference to the accompanying figures in which:

FIGS. 4-9 are simplified block diagrams of exemplary templates or instances for communication chips fabricated from the slice and the application sets above in accordance with embodiments of the invention.

DESCRIPTION OF THE INVENTION

Figure 1:
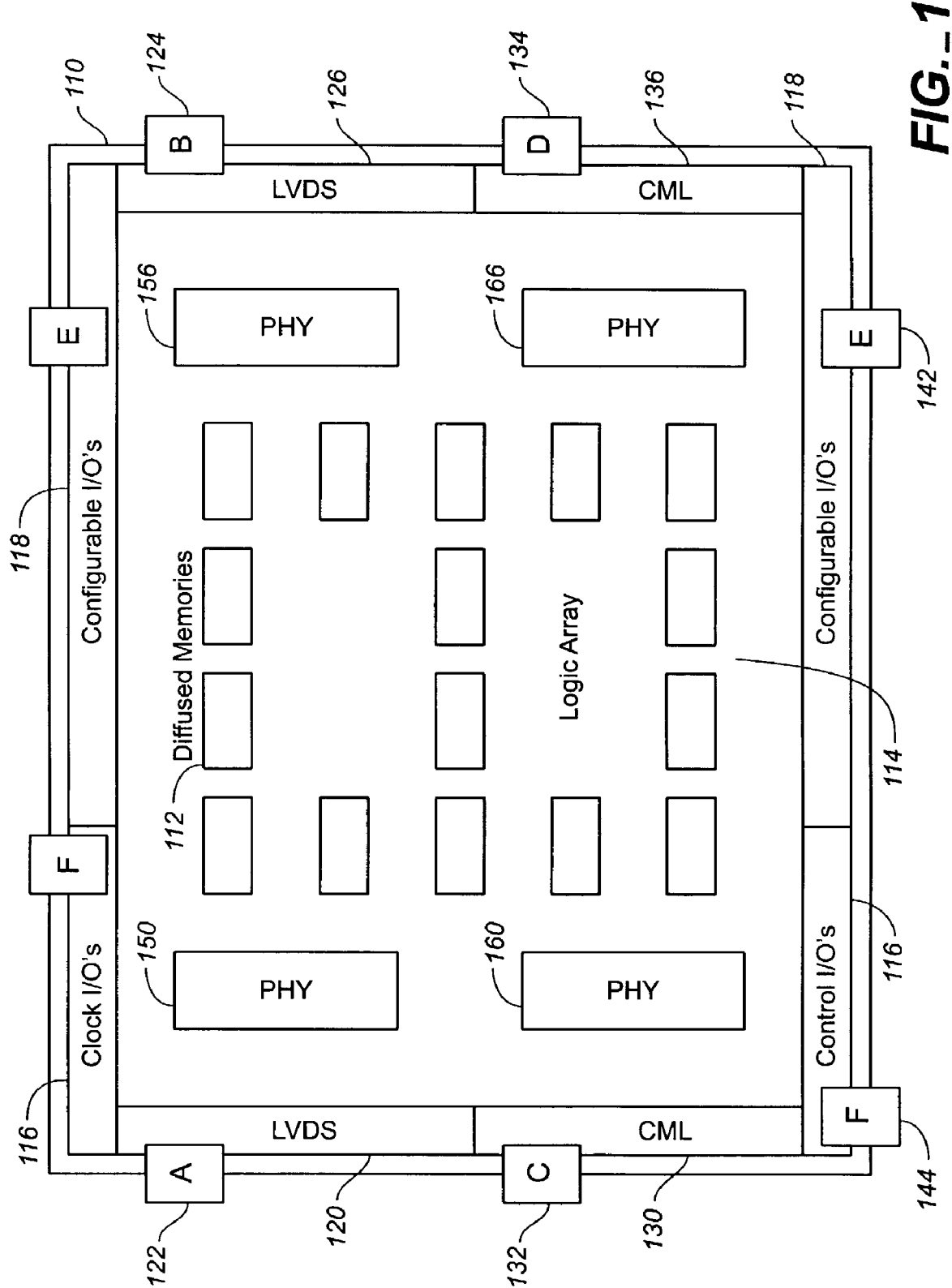
FIG. 1 is a simplified block diagram of a semiconductor slice from which several instances of networking and communication chips can be fabricated in accordance with an embodiment of the invention.

What is envisioned and disclosed herein is a suite of templates of integrated circuits having a basic structure of PHYs, protocol layers, configurable diffused memories and logic arrays that support communication and networking functions for a variety of data transmission protocols, including some industry standards. Viewing FIG. 1, a slice 110 is shown. The slice 110 comprises a base semiconductor wafer from, e.g., silicon, silicon-on-insulator, silicon germanium, gallium arsenide, other Type II, IIII, IV, and V semiconductors, and is designated as a single area of semiconductor material having diffused memory 112 and gate arrays 114, both of which are configurable. More particularly, a slice 110 may be considered a partially manufactured semiconductor device in which the layers up to the connectivity layers have been fabricated, i.e., a slice is the physical resources available to be described by the application set and used by either the logic provided in the application set or future designs. By fabricating different arrangements of transistors into the wafer layers, called diffusing, different electronic functions can be easily realizable. Hardmacs refer to those areas of the slice that have been diffused for specific purposes, such as PHYs, phase lock loops (PLLs) for clocks, diffused memories, serializers/deserializers (SERDES), etc. Optionally, however, the slice 110 may include the contact mask and some of the higher layers of connectivity that are fixed for distribution of power, ground, and external signal I/O. Around the periphery are a number of I/O blocks 116, 118, 120, 126, 130 and 136, one of which may provide control voltages for the clock, power, and ground at 116 having port F 144 for connection to JTAG, PLL signals, etc. Others may be not fixed but remain configurable for other I/O blocks 118 to be determined, e.g., to connect port E 142 for low voltage transistor to transistor logic (LVTTL) signals at a speed on the order of several hundred Mbps or less. Still other I/O blocks 120 may be fixed to receive and transmit a number of communication channels at specified voltages, for example, channels of LVDS signals at port A 122 and port B 124. By way of example, the LVDS I/O blocks 120 and 126 may be connected to hardmac PHYs 150 and 156, respectively, to transmit and receive the data at these voltage levels. FIG. 1 also illustrates that the slice 110 has I/O ports C 132 and port D 134 to transmit and receive yet a different voltage signal through a different number of channels, in this case, CML signals at a speed on the order of several Gbps into the I/O blocks 130 and 136. The CML signals may be transmitted and received at gigabit per second speeds by a different hardmac PHYs 160 and 166, respectively. Note that the configurable I/O blocks may also be configured to receive and transmit those signals at the voltage levels of the fixed I/Os. Thus configurable I/O block 118 may be configured to also receive and transmit LVDS or other voltage level signals.

One of skill in the art will appreciate that the slice 110 shown in FIG. 1 is an example only. Different slices may contain different PHYs, a different number of PHYs, different number and type of ports and I/O blocks for different voltages and different number of channels, different amounts of diffused memories, compiled memories, etc. depending upon the purpose of the final integrated chip. This slice 110 and others, moreover, may be further configured to include higher or lower level protocol layers and/or data processing layers. Some of these options will be explored and discussed with respect to FIGS. 4-9, but it has been determined that some configurations are likely to work better for certain applications, such as for fiber optics and/or Ethernet. The point is that there are different levels of customization for different protocols and for different protocol layers for different end products.

The slice itself is of little use, it is only hardware; so some logic infrastructure is required to make the slice useful. Shells are this logic infrastructure and together, the shells and the slice comprise an application set. There are several shells that may be used as a basis for different application sets. An RTL shell is implemented in the gate array 114 to encapsulate the logic of the diffused hardmacs, and may typically include a significant amount of preplaced, timed, and proven components, such as analog SERDES hard macro components, clock generators, microprocessors, etc. The RTL shell may comprise a simple logical interface to directly connect the signals to external chip I/Os, or it may be a more complex set of proven logic. For example, the RTL shell could include a complete PCI bus controller and/or a USB bus controller including all the connections to external I/Os. Another shell available may be a synthesis shell having scripts to synthesize any generated logic for the final applications. These synthesis scripts will have been optimized for the slice's gate array. There may be a timing shell that includes the timing constraints for all blocks and interfaces. Stamp models of the RTL shell components connected to the chip I/Os may also be included in the timing shell. A verification shell may include components such as transactors, monitors or interface checkers, scoreboards, reference models, and test suites between the internal logic interfaces and the chip I/Os. A test shell might include the stub interface that brings scan chains to the customer logic plus any preexisting test engines and mechanisms in the shell and slice. Thus, these shells listed and others provide proven interfaces and controllers that may be in compliance with industry standards.

Figure 2:
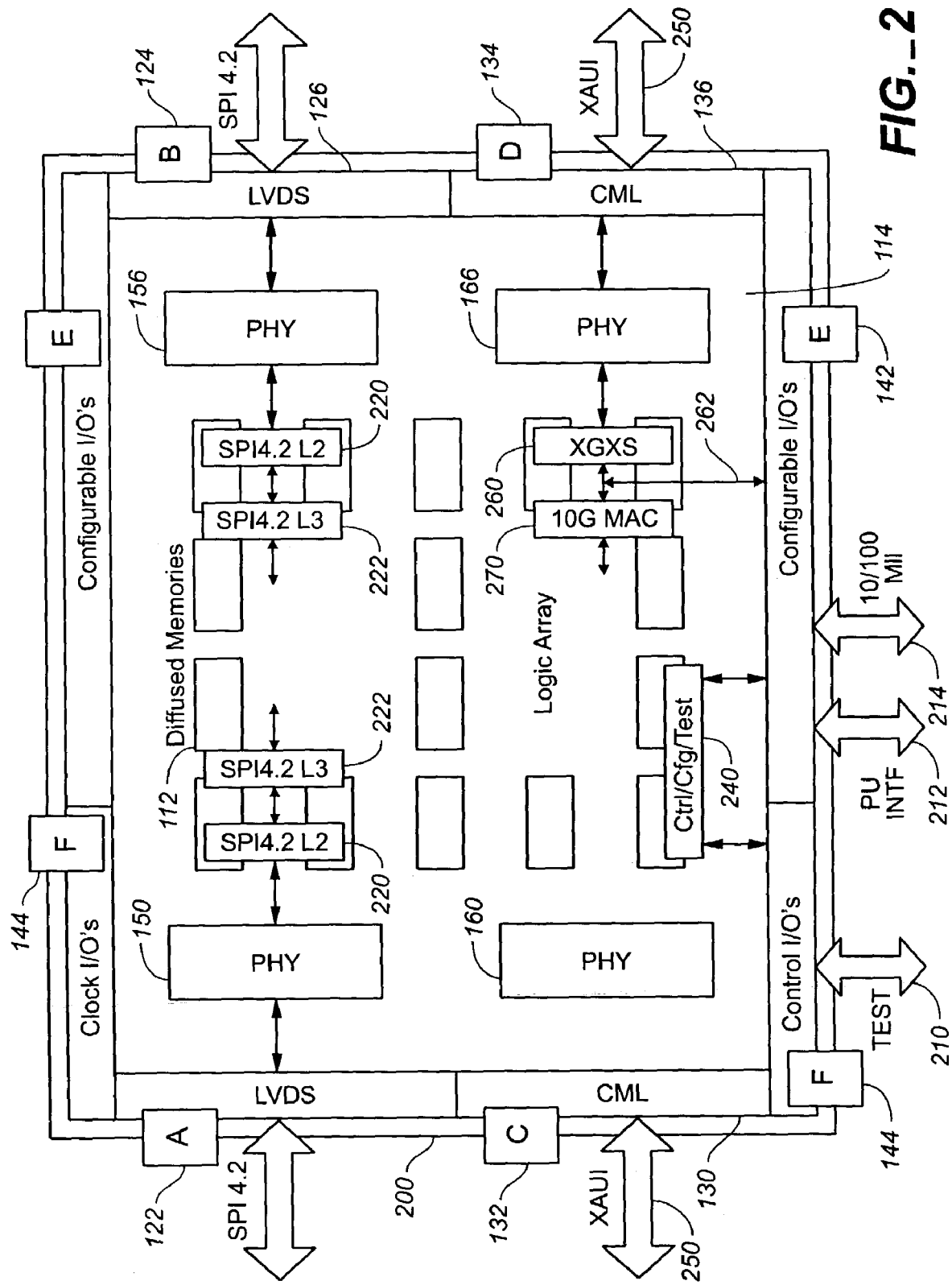
FIG. 2 is a simplified block diagram of an application set derived from the slice of FIG. 1 that can be fabricated in accordance with an embodiment of the invention.
Figure 3:
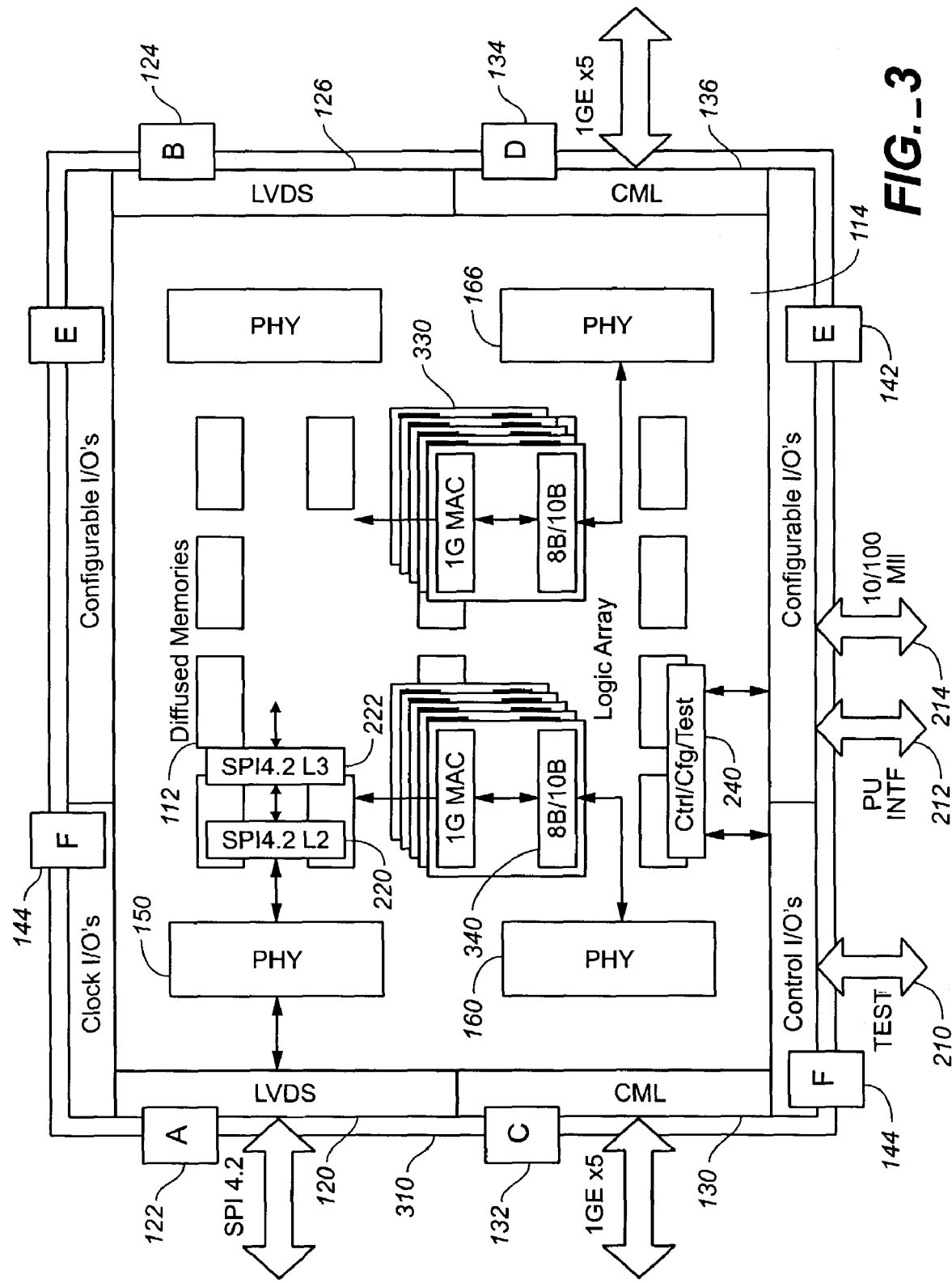
FIG. 3 is a simplified block diagram of another application set derived from the slice of FIG. 1 that can be fabricated in accordance with the invention.

Applications sets are shown in FIGS. 2 and 3. An application set represents an integrated design, i.e., the slice and the shells, that has been verified with inserted clocks and test interconnects. The remainder of a design can be placed and routed amongst the existing resources to create the small set of remaining masks necessary to create a specialized integrated circuit. The application sets of FIGS. 2 and 3 comprising the slice and its shell could be designed and fabricated according to the principles of application Ser. No. 10/318,623, U.S. Pat. No. 7.069,523 issued with the title: Automated Selection and Placement of Memory During Design of an Integrated Circuit Among the many possible application sets are those configurable for communication platforms such as SPI4.2, Serial ATA, Ethernet, Fibre Channel, PCI Express, USB, ATM, etc. With respect to FIGS. 2 and 3, in addition to the components of the slice of FIG. 1, port F 144 of the application sets 200 and 310 may be connected at 210 for testing, such as JTAG boundary scan testing, self-tests, etc. A control I/O interface 210 may further be connected to logic and buffers 240 that facilitate the control, configuration, and the test of the circuits therein. Application sets 200 and 310 may interface at 212 to Port E 142 to connect to a processing unit (PU) that might be, e.g., a network processor unit (NPU) or a central processing unit (CPU). Also port E 142 could include a media independent interface (MII) 214 for receipt and transmission of audio, textual, video, and other data. Signals to/from the processor and the MII interfaces may be connected to logic and buffers 240 to configure the hardmacs and the shells of the application sets, or alternatively, may be connected to protocol layers (not shown) for direct data communication. One will appreciate that these connections and interfaces are by way of examples only; that they are configurable to accommodate other voltages, signals, purposes, etc.

and that in the industry at this time, some of the connections and voltages shown are useful communication platforms.

The application set of FIG. 2 has been configured to receive and transfer data according to the SPI4.2 industry standard and/or a 10 Gigabit Ethernet standard, and to interface that data with various other protocols as will be discussed. Portions of the diffused memory 112 and logic array 114 have been fabricated as a level 2 protocol layer 220 and level 3 protocol layer 222 to receive and transmit data which may be, e.g., eighteen channels of high speed gigabit serial data, to/from PHYs 150 and 156, PHYs that may comprise, e.g., extremely high bandwidth CMOS circuits. One such PHY is HyperPHY, a trademarked PHY available from LSI Logic, Inc. Also shown in FIG. 2, are two I/O blocks or interfaces 130, 136 for an optional XAUI high speed data 250 into and out of a compatible PHYs 160, 166 for high speed data. XAUI supports up to 10 Gbps using four transmit and four receive lines for differential serial transmission and operates at 3.125 Gbps. XAUI may require an appropriate extender sublayer, XGXS, 260 to extend the XGMII (ten gigabit media independent interface) and a 10G MAC 270 that may be configured from memory 112 and logic array 114 according to the principles disclosed herein. One such PHY for XAUI is Giga-Blaze, also a trademarked PHY available from LSI Logic, Inc. Alternatively, data may be routed from the 10G MAC 270 on a different path 262 to additional protocol layers (not shown) and out the same configurable I/O block 118 having ports to the processor unit interface 212 and the 10/100 MII 214. Meaningful RTL shells used in the application set of FIG. 2 may include a MW SPI4 core, the XGXS 260 and its test stub, a clock factory, a JTAG interface, appropriate memory wrappers, and memory and I/O stubs. Thus, as will be shown, the application set of FIG. 2 supports the platforms of FIGS. 4-6.

The application set of FIG. 3 has been configured to receive and transfer data according to two industry standards, the SPI4.2 standard and the Gigabit Ethernet standard. Note that the protocol layers include a number of MACs 330 generated from diffused memory 112 and the logic array 114 to enable a ten Gigabit Ethernet protocol. Thus data in SPI4.2 protocol is received at port A 122, and I/O block 120, and its PHY 150. The data is processed through the compatible protocol layers 220 and 222 and connected to a protocol layer configured as a gigabit MAC 330. Therein the data is transformed and encoded by encoder/decoder 340 to be output through two corresponding PHYs 260, 266 as Gigabit Ethernet data. An 8B/10B or other encoder/decoder 340 may be included in the application set of FIG. 3. One of the requirements of many serial standards, e.g., InfiniBand, FibreChannel, Gigabit Ethernet, ATM, ESCON, and DVB-ASI, is that 8B/10B encoding and decoding are used on the original data stream. Encoding/decoding ensures sufficient valid transitions for clock recovery so that the clock does not drift and data is not lost; it also balances the DC signal and detects many signaling errors immediately. Note that the port B 124, the I/O block 120 and PHY 156 may not even have been connected via the connectivity layers, or if connected, may not have been instantiated, or if instantiated, may be stubbed as discussed later. In any event, the port B 124, I/O block 126 and PHY 156 are not connected and are not functional. The application set of FIG. 3 can be further configured to yield the instances of FIGS. 6-9.

Figure 4:
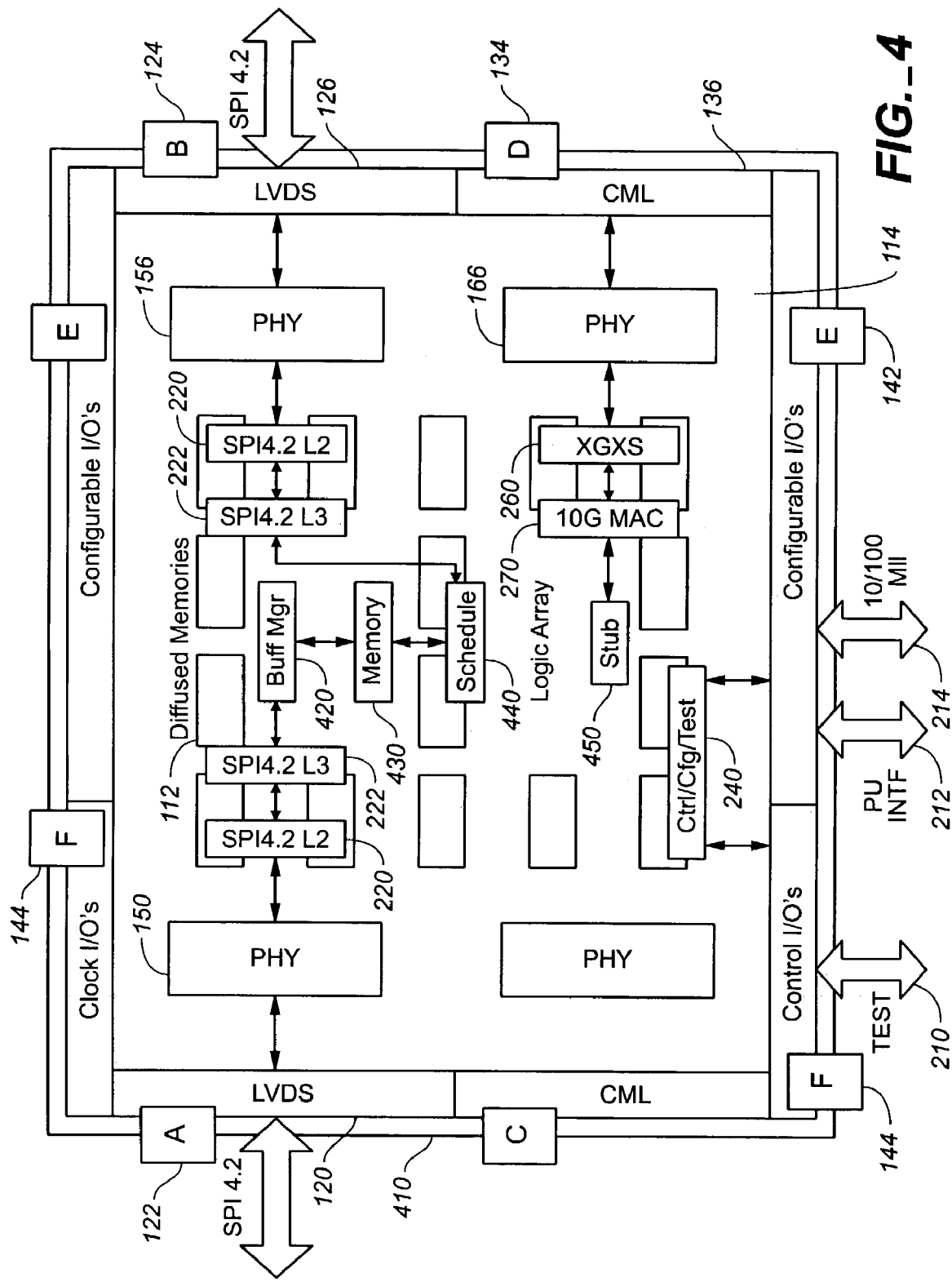

With respect to FIG. 4, the application set of FIG. 2 has been further defined to transmit and receive SPI4.2 data, such as for port mapping or as a repeater. In particular, some of the logic array 114 has been generated as a buffer manager 420, and a scheduler 440. Some of diffused memory 112 and the logic array 114 have been generated as memory 430. Thus, the application set has been further configured to be a networking or communications chip for SPI4-2 data. Note that PHY 166, XGXS 260, and the MAC 270 have been stubbed at 450. Stubbed simply means that its inputs are tied to inactive levels.

Figure 5:
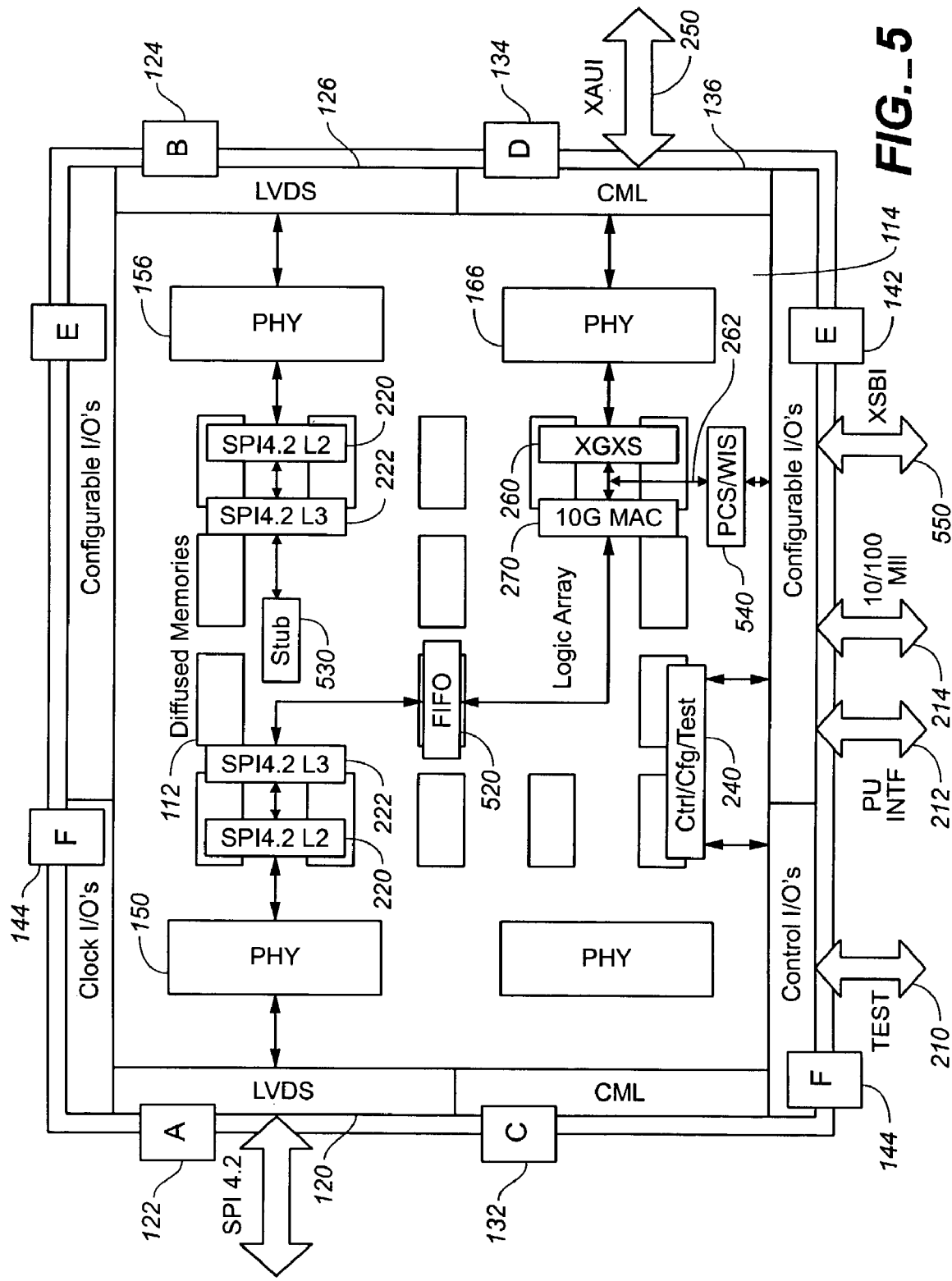

FIG. 5 is another instance of a communication platform that can easily be configured from the application set of FIG. 2 for connecting Gigabit Ethernet data between SPI4.2, and XAUI protocols or XSBI protocols. A buffer 520, such as a first in first out (FIFO) buffer, has been configured from diffused memory 112 and the logic array 114. From the FIFO 520, data accesses a 10G MAC 270. Then from the 10G MAC 270, a configuration gate may send the data to an extender sublayer XGXS 260. Data then enter/exits a PHY 166 compatible with the number of channels and the frequency, and then is sent or received to/from I/O block 136 and port D 134. Alternatively; however, data may be tapped out of the 10G MAC 270 to a PCS/WIS (physical coding sublayer/WAN interface sublayer) 540 to become XSBI protocol data 550 for transmission or for XSBI protocol data 550 to be received and converted to SPI4.2 data.

Figure 6:
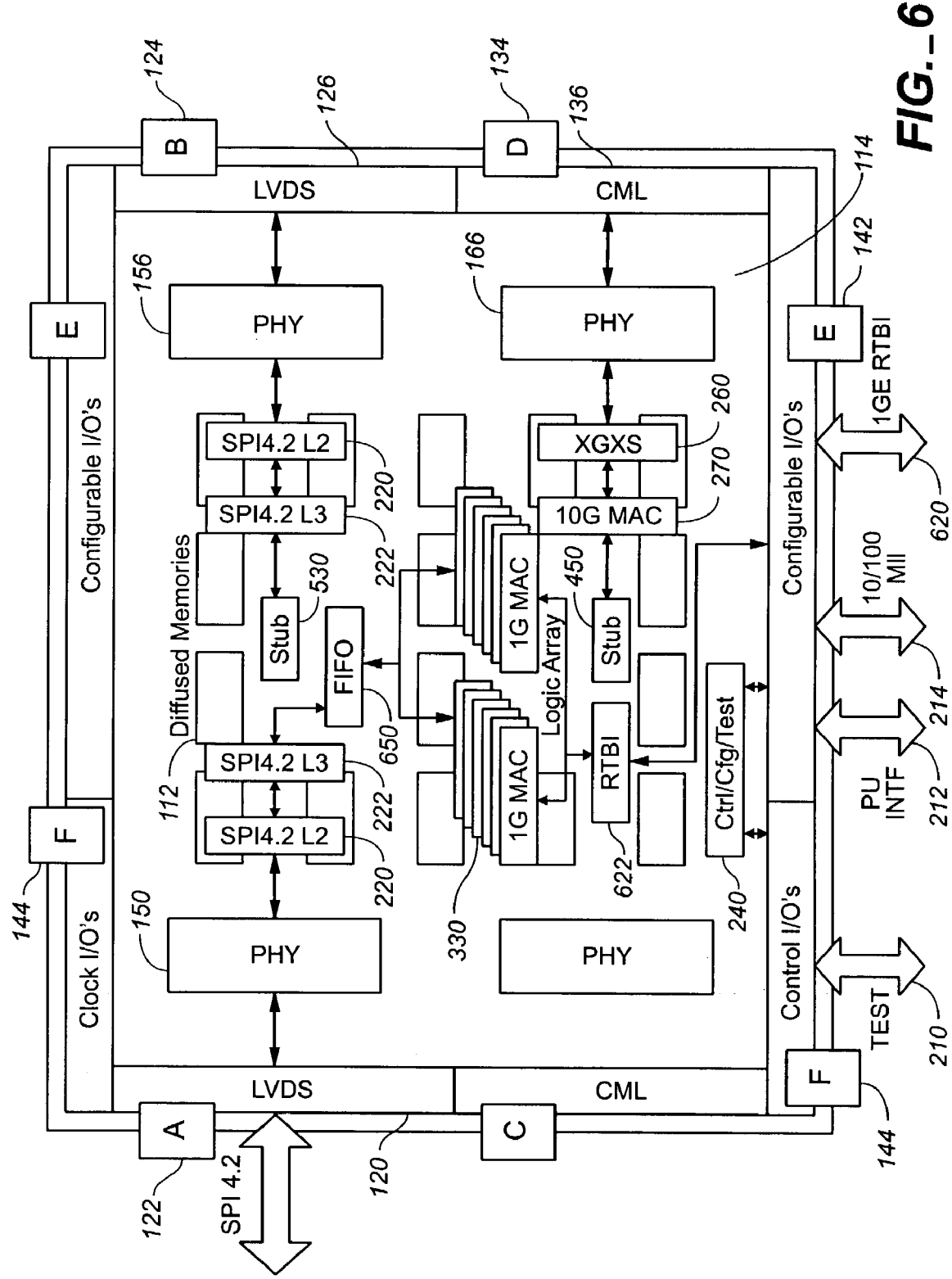

FIG. 6 illustrates a flexible template in which SPI4.2 protocol can be transferred to several I/Os including a Gigabit Ethernet reduced ten bit interface (RTBI) 620 and 622, and/or a media independent interface 214 and/or a processor unit interface 212. In this instance, a FIFO 650, ten 1G MACs 270 could be configured from the logic array 114 and the diffused memory 112. Note that the other ports, their respective PHYs, and MACs are stubbed as in 450 and 530.

Figure 7:
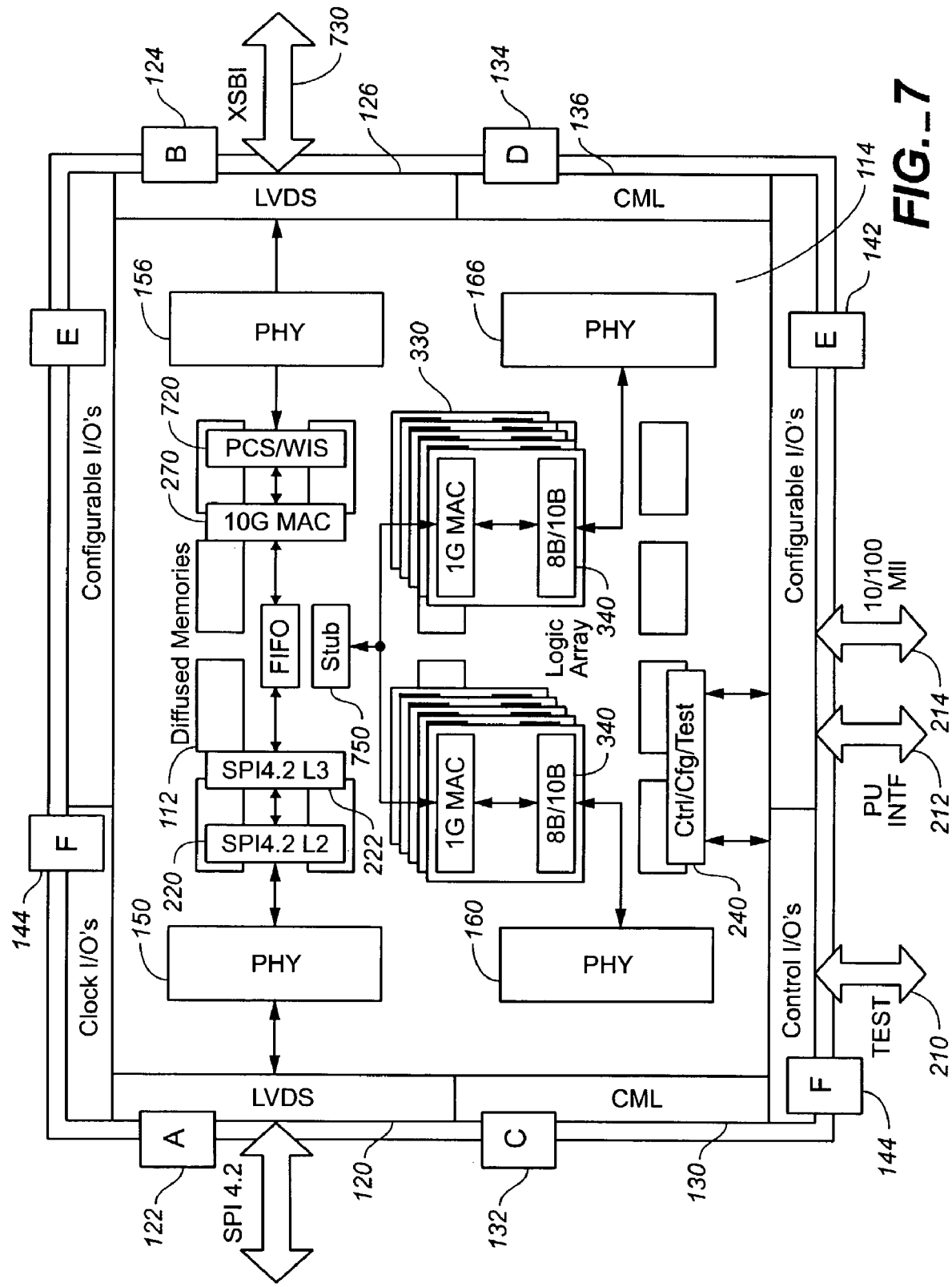

FIG. 7 illustrates a flexible template from the application set of FIG. 3. Here the Gigabit Ethernet PHYs in the lower half of the figure have been stubbed at 750 and the data is converted from SPI4.2 protocol to a ten gigabit sixteen bit interface (XSBI) 730. Note that a 10G MAC 270 and a 64B/66B PCS/WIS protocol sublayer 720 have been generated from memory 112 and the logic array 114.

FIG. 8 is yet another flexible instance derived from the application set of FIG. 3. Again, the Gigabit Ethernet transceivers in the lower half of the figure have been stubbed and now the data flows to/from a SPI4.2 protocol and a SFI4.1 protocol 830. Here a protocol layer 840 for SFI4.1 has been generated from memory 112 and the diffused logic 114, as have a buffer manager 850, memory 860, and a scheduler 870. FIG. 9 is yet another flexible instance in which SPI4.2 data can be converted to and connected with a number of one Gigabit Ethernet fibers.

Thus what has been demonstrated is that numerous bridging and communication chips can be configured from partially manufactured semiconductor slices and shells formed as application sets for data transmission protocols. Although shown here as enabling SPI4.2 and 1/10 Gigabit Ethernet protocols, the invention is not limited to these particular protocols. The number of channels, the voltage levels, and the numbers and kinds of protocol layers are other variables that can be accommodated by the templates as determined by the slice and the shells. Any particular nomenclature is used merely for convenience, and thus the invention should not be limited to use solely in any specific application identified and/or implied by such nomenclature. The illustrated embodiments are not intended to limit the present invention. Indeed, those skilled in the art will recognize that other alternative protocols and/or PHYs and protocol layers may be used without departing from the scope of the invention. Rather, the invention is as claimed is:

What is claimed is:

1. A template of integrated circuit for a plurality of data transmission protocols, the template comprising:

(a) a plurality of input/output (I/O) blocks;

(b) a plurality of data register transfer level logic (RTL) shells encapsulating the I/O blocks, the plurality of RTL shells encapsulating logic of a diffused hardmac and including: serializer/deserializer (SERDES) hard macro components, clock generators, microprocessors, a peripheral component interconnect (PCI) bus controller and a universal serial bus (USB) bus controller, wherein the plurality of RTL shells are configured for providing a logical interface for connecting signals to external chip I/Os;

(c) a plurality of physical layers (PHYs) connected to each of the plurality of I/O blocks; and at least one of the plurality of I/O blocks and the connected one of the plurality of PHYs are established to transmit and receive data in a first protocol, and at a second one of the plurality of I/O blocks and a connected second one of the plurality of PHYs are established to transmit and receive data in a second protocol, wherein at least one of the plurality of PHYs is stubbed;

(d) a plurality of configurable gate arrays, a first portion of which is configured into a first protocol layer connected to at least one of the plurality of PHYs consistent with the first protocol, and a second portion of the plurality of gate arrays is programmed to establish a second protocol layer connected to at least a second one of the plurality of PHYs consistent with the second protocol;

(e) a plurality of memory arrays generated from diffused memory and/or gate array configured to establish the first protocol layer and a second portion of which is configured to establish the second protocol layer,
wherein the template is further configured for translating data between the first PHY in the first protocol and the second PHY in the second protocol.

2. The template of claim 1, further comprising a integrated circuit wherein the first protocol is system packet level interface 4, phase 2 (SPI4.2) and the second protocol is Gigabit Ethernet and the integrated circuit is derived from the template.

3. The template of claim 1, wherein the first protocol is SPI4.2.

4. The template of claim 1, wherein the second protocol is 1/10 Gigabit Ethernet.

5. The template of claim 1, wherein the second protocol is SPI4.2.

6. The template of claim 1, wherein the second protocol is serializer/deserializer framer interface level 4, phase 1 (SFI4.1).

7. The template of claim 1, wherein the second protocol is 10/100 Ethernet.

8. The template of claim 1, wherein the second protocol is a processor protocol.

9. The template of claim 1, wherein the template is implemented in a network router.

* * * * *